United States Patent [19]
Mercat

[11] Patent Number: 5,632,364
[45] Date of Patent: May 27, 1997

[54] FREE WHEEL HUB FOR CYCLES

[75] Inventor: Jean-Pierre Mercat, Chaneins, France

[73] Assignee: Mavic S.A., Sur Moignans, France

[21] Appl. No.: 526,664

[22] Filed: Sep. 11, 1995

[30] Foreign Application Priority Data

Sep. 9, 1994 [FR] France .................... 94 10931

[51] Int. Cl.⁶ .................................................. F16D 41/30
[52] U.S. Cl. ........................... 192/64; 192/46; 301/110.5
[58] Field of Search .................... 192/64, 46; 301/105.1, 301/110.5

[56] References Cited

U.S. PATENT DOCUMENTS

| 2,394,112 | 2/1946 | Schwinn | 192/64 |
| 3,865,220 | 2/1975 | Thompson, Jr. | 192/46 |
| 4,580,670 | 4/1986 | Nagano | 192/64 |
| 4,585,905 | 4/1986 | Radar, III | 192/64 |
| 4,595,242 | 6/1986 | Wehmeyer | 301/110.5 X |

FOREIGN PATENT DOCUMENTS

| 1334006 | 12/1963 | France . | |
| 2519718 | 1/1980 | France . | |
| 2024342 | 7/1983 | Germany . | |
| 18711 | of 1898 | United Kingdom | 192/64 |
| 2063393 | 6/1981 | United Kingdom | 192/64 |

Primary Examiner—Richard M. Lorence
Attorney, Agent, or Firm—Pollock, Vande Sande & Priddy

[57] ABSTRACT

Free wheel hub for cycles, in which the wheel hub is driven by the free wheel, by means of a unidirectional connection constituted by the cooperation of at least one movable ratchet acted upon by a spring so as to move toward an operative projecting position, in which it cooperates with teeth, this ratchet being free to pivot on a support piece fastened to the hub body, while the teeth are produced on a free wheel body. The ratchet-support piece is made of a material whose mechanical properties and/or density are similar to those of the material used to make the hub body, this ratchet being mounted so as to pivot on a gauge rod attached to the support piece, this gauge rod being made of a material whose mechanical properties and/or density are similar to those of the material used to manufacture the free wheel body.

12 Claims, 6 Drawing Sheets

FREE WHEEL HUB FOR CYCLES

FIELD OF THE INVENTION

The present invention relates to a free wheel hub which is mounted on the rear wheel of a cycle and which comprises one or several gears capable of cooperating with a drive chain movable transversely by a gearshift, when multiple gears are used.

BACKGROUND OF THE INVENTION

In most present-day hubs, the unidirectionally-rotating link between the body of the hub and a free wheel body carrying the gears is formed by two tangential ratchets moving in a plane perpendicular to the axis and cooperating with a ratchet wheel, and interposed, with this ratchet wheel, between the aforementioned components.

Cycle users may be only recreational cyclists, but also competitors worried about performance. The latter always seek the strongest and lightest bicycles possible in order to satisfy their passion. The lightness of the components is thus an ongoing concern for manufacturers, but, as regards free wheels, nothing has been improved to date and the various manufacturing components of the free wheel are made of a high-density material such as steel, in order to withstand all of the stresses acting upon them during use of the cycle. Traditionally, therefore, the part attached to the hub body carries the ratchets or teeth, and the free wheel body carries, conversely and respectively, the teeth or ratchets, which are made of steel. Even if, as regards performance levels, this solution proves suitable, the same is not true with respect to weight, which is considered to be too great. It should be noted, moreover, that in present-day systems the part fastened to the hub body and carrying the ratchets is an additional, separate component attached to the hub body, this component being made of steel, as indicated above, while the hub body is made of aluminum.

SUMMARY OF THE INVENTION

The present invention is thus intended to solve the difficulties encountered in conventional hubs, and it proposes a new design for a light, high-performance free wheel, since the part of the hub body ensuring the connection with the free wheel is made of a material whose mechanical properties are substantially identical to those of the material in the hub body itself. For example, it may be made of aluminum or a plastic material, and may, advantageously, even be an extension of the actual hub body.

Accordingly, the free wheel hub for cycles is of the type in which the wheel hub is driven by the free wheel by means of a unidirectional connection formed by the cooperation of at least one movable ratchet, which is acted upon by an elastic system so as to travel from one inoperative, retracted position to an operative, projecting position, in which it cooperates with teeth, the aforementioned ratchet being free to pivot on a support piece attached to the hub body, while the teeth are formed on a free wheel body mounted so as to pivot on this ratchet-support piece, in which the ratchet-support piece is made of a material whose mechanical properties and/or density are similar to those of the material used to produce the hub body, the ratchet being mounted so as to pivot on a gauge rod attached to the support piece, this gauge rod being made of a material whose mechanical properties and/or density are similar to those of the material used to manufacture the free wheel body.

In accordance with additional features, the material composing the ratchet-support piece has a rupture strength of between 700 and 200 megapascals, e.g., aluminum or a plastic material, while the material composing the gauge rod and/or the ratchet has a rupture strength of between 1,000 and 2,000 megapascals.

According to an additional feature, the ratchet-support piece comprises a peripheral wall in which the rod on which the ratchet pivot is fixed, and, in a preferred configuration, this rod is an extension of the hub body and forms an integral part of the latter. It should be noted that the peripheral wall comprises a housing designed to house the ratchet, while the ends of the rod are embedded in the cylindrical wall of the support piece and the central part thereof rests on a corresponding surface of the cylindrical wall.

The ratchet incorporates a meshing end and a pivoting end, which is a cylindrical surface cooperating with the surface of the central portion of the gauge rod, while the elastic system is a torsion spring comprising an actuating piece and a support piece, the actuating end comprising an end designed to cooperate with an inclined surface produced on the ratchet on the bottom of a central slot, whose lateral walls ensure lateral position retention of the actuating piece and the end thereof.

The hub according to the invention is mounted so as to pivot around an axis by means of at least two terminal ball bearings i.e., on one side, two ball bearings housed in a first end housing in the cylindrical wall of the support piece, and, on the other side, a third ball bearing is housed in another end housing provided in the hub body. The assembly constituted by the hub body and the ratchet-support piece is, moreover, held in position laterally by the third ball bearing, which is, in turn, stopped laterally by a locknut and by one of the two other ball bearings one of which comprises a circlip or shoulder, the two bearings being stopped laterally over the inner diameter thereof by the hollow end piece. The locknut of the third bearing advantageously undergoes a braking action produced by a sealing ring and allows adjustment of the bearing-mounting play, the locknut thus performing immobilizing and adjustment functions.

BRIEF DESCRIPTION OF THE DRAWINGS

Other features and advantages of the invention will emerge from the following description provided with reference to the attached drawing figures, provided solely by way of example.

DETAILED DESCRIPTION

Figure 1:
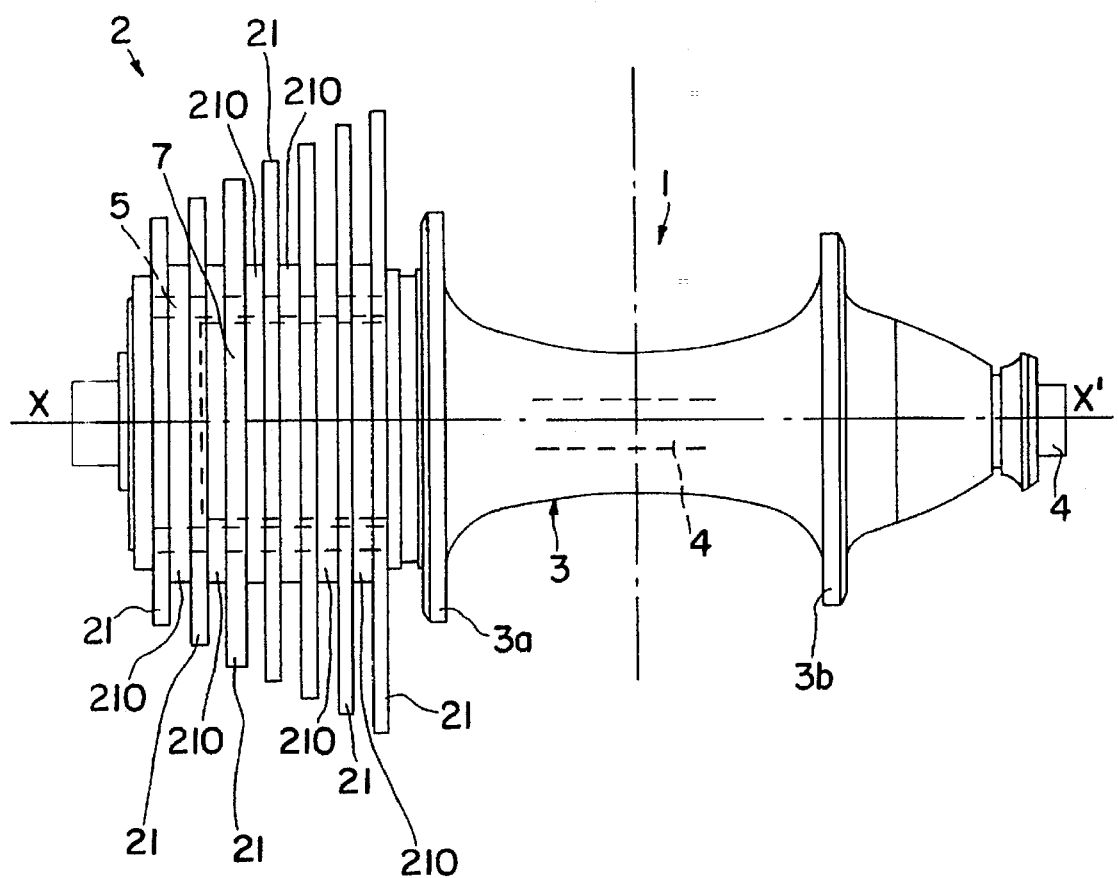
FIG. 1 is an exterior view of the hub according to the invention.
Figure 2:
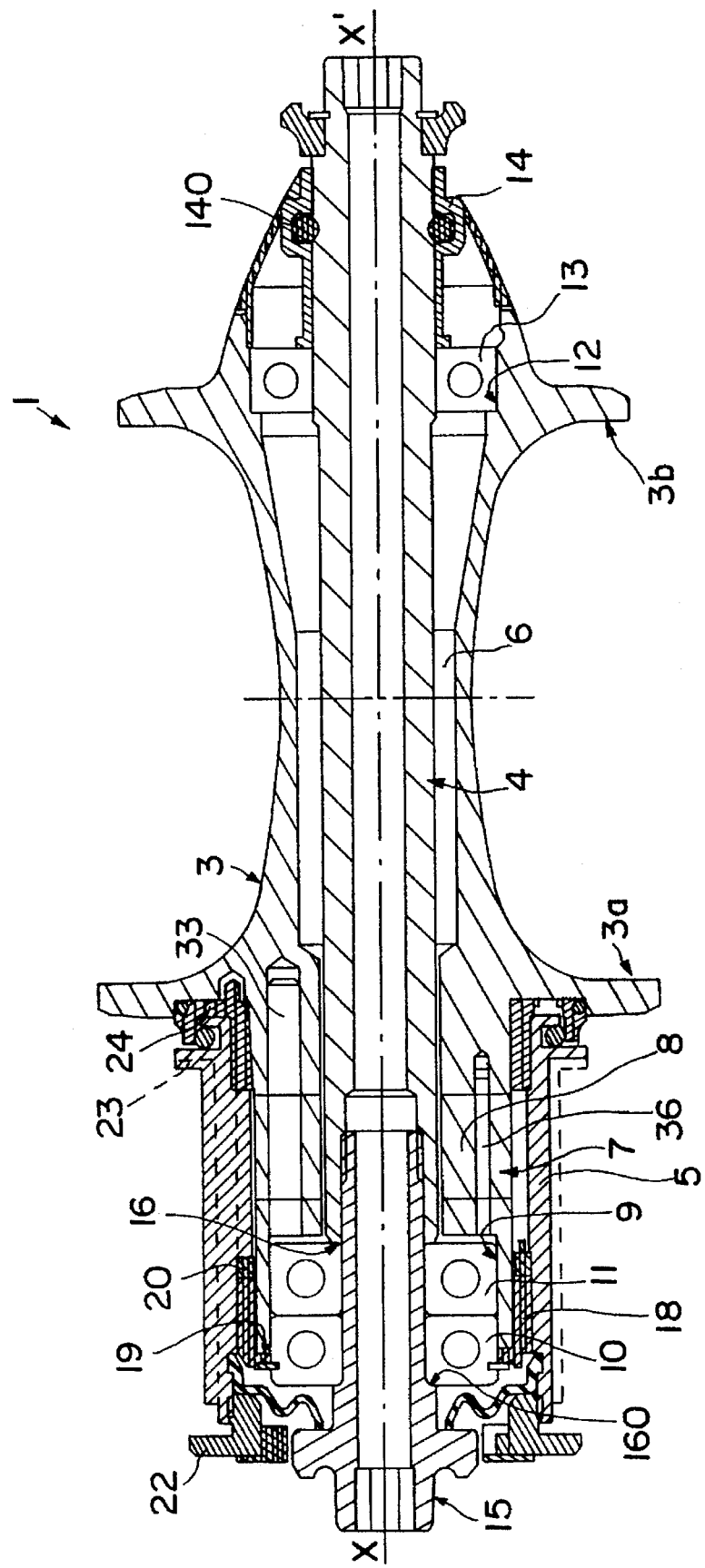
FIG. 2 is a longitudinal cross-section of the hub assembly.
Figure 3:
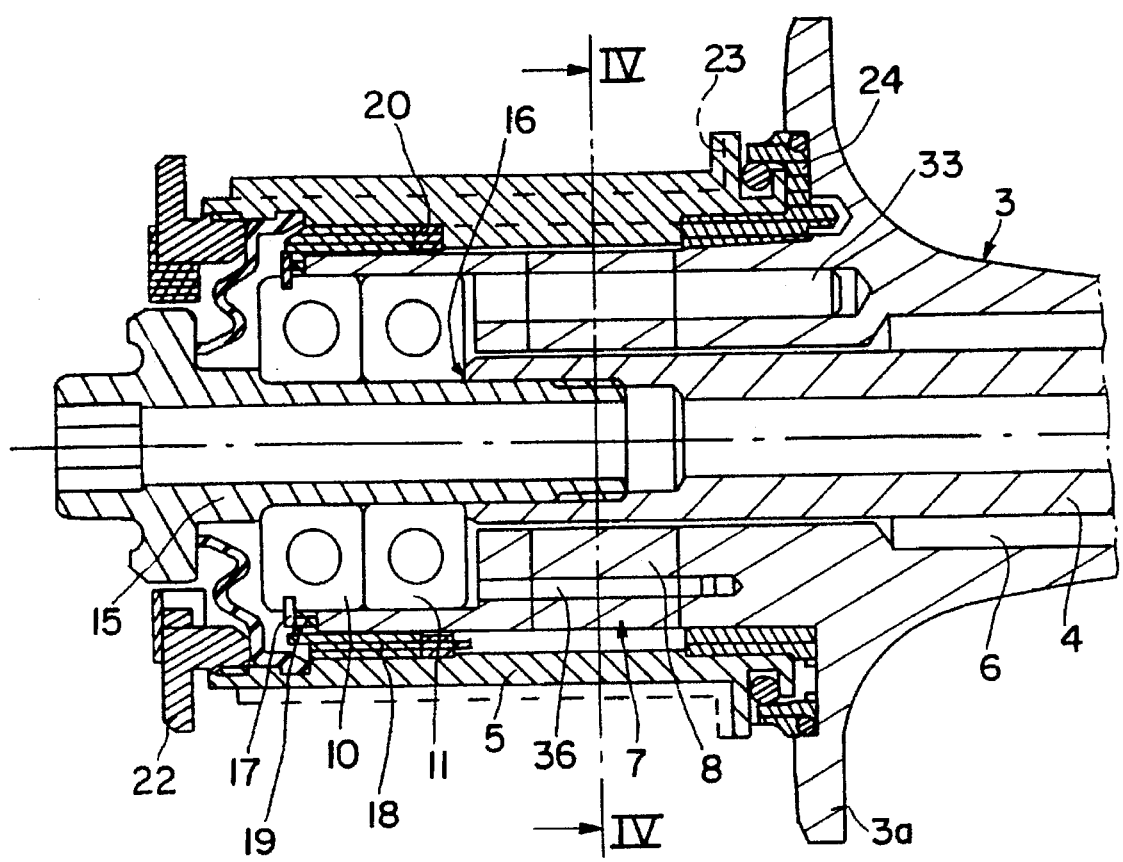
FIG. 3 is a partial cross-section showing, more specifically, the portion relating to the invention.

The free wheel hub is constituted by a wheel hub 1 driven unidirectionally by the free wheel 2 having a body 5. The hub body 3 is mounted for free rotation on a hollow shaft 4, the rod of a mechanism allowing quick immobilization of the hub and the ends of the cycle forks not being illustrated to enhance understanding of the drawing. The hub body 3 is attached to two side plates 3a, 3b equipped in conventional fashion with holes for the attachment of spokes (not shown) connecting the body to the wheel rim.

The hub body 3 comprises a central hole 6 designed to house the hollow shaft 4. In addition, and according one feature of the invention, the hub body 3 comprises, on the free wheel body 8 side, a tubular extension 7 comprising a cylindrical wall 8 whose end incorporates a first housing 9 intended to house two end ball bearings 10, 11. The other end of the hub body 3 comprises another housing 12 designed to house a third ball bearing 13. The three bearings 10, 11, 13 are held in place on the hollow shaft 4, which comprises, on one side, a locknut 14 for the third bearing 13, and, on the other side, an end portion 15 of the hollow shaft extending the hollow shaft itself 4, which end portion is designed to hold in place laterally the assembly constituted by the first and second bearings 10, 11, which are forced in a support arrangement on the corresponding transverse face 16 of the aforementioned hollow shaft 4 through the action generated by the transverse face 160 of the end portion 15 screwed into the hollow shaft. The hub body is thus mounted so as to rotate on the hollow shaft 4 and the end portion 15 thereof by virtue of the three ball bearings 10, 11, 13. Immobilization in lateral translational motion along the axis X—X' is ensured, on one side, by means of the third bearing 13 and, on the other side, by a circlip 17 engaged in a groove in a second ball bearing 11, against which rests a position-retention ring 18, which itself rests on the transverse face 19 of the tubular extension 7, this position-retention ring ensuring, moreover, lateral immobilization of the free wheel body 5 by means of a circular ring 20 fastened, while being free to rotate, to the aforementioned free wheel body 5, since it is immobilized in rotation by several securing projections.

The locknut 14 undergoes a braking action exerted by the sealing ring 140, which is made of elastomer, a deformable material of the known plastic type, and this locknut allows adjustment of the axial play of the hub, and thus constitutes an adjustment/immobilization hub.

In conventional fashion, the free wheel body 5 incorporates grooves on it circumference, thereby forming a device for positioning and rotational actuation of staged gears 21, which constitute the gear-change components. These gears are separated by spacers 210 and are secured in translational motion on the body 5 by means of an end nut 22 which presses then against the face of a collar 23 arranged at the other end of this free wheel body 5. Moreover, a support, friction, and sealing ring 24 is provided between the free wheel body 5 and the hub body 3, and, more particularly, between the tubular extension 7 and the side plate 3a thereof.

The unidirectional rotational connection between the hub body 3 and the free wheel body 5 carrying the gears is, in conventional fashion, provided by two rotationally-movable tangential ratchets 25a, 25b, in order to be able to pivot in a plane perpendicular to the axis X—X' against the action exerted by spring 26a, 26b and to cooperate with a series of teeth 27 arranged on the inner peripheral face 28 of the free wheel body 5.

The free wheel body 5 is made of steel, while the extension of the hub body 3, which carries the ratchets 25a, 25b, is made of aluminum, as is the hub body 3. It in the preferred embodiment as illustrated, the extension 7, which could be called the "driven end piece," constitutes a support piece for the ratchets, and that this piece advantageously forms an integral part of the hub body 3, since it is the extension thereof. Furthermore, each of the ratchets 25a, 25b is made of steel and comprises a meshing end 29 and a pivoting/support end 30. Each of the ratchets 25a, 25b is housed in a corresponding housing 31a, 31b formed in the cylindrical wall 8 of the extension 7, the width of each housing being slightly greater than the width of the ratchet, taking play into account, in order to stop it in lateral motion, while allowing it to pivot. In fact, as indicated above, each of the ratchets pivots around a virtual axis 32a, 32b parallel to the hub axis X—X' and constituted by a cylindrical support gauge rod 33a, 33b, which is made of steel and whose ends 330, 331 are embedded in the aluminum cylindrical wall 8, of which the central portion 332 rests against the support face 34, in order to be able to absorb the stresses transmitted by the corresponding ratchet. The pivoting end of the ratchet 30 is a cylindrical surface cooperating with the corresponding surface of the central portion 333 of the gauge rod, and that the gauge rod is housed in a cylindrical hole whose axis X is parallel to the axis of the hub and which opens at the end of the extension.

Each of the ratchets is stressed in the position of engagement with the teeth of the free wheel body by an elastic system constituted by a torsion spring, 26a, 26b, respectively, whose free end 260 rests on an inclined surface 35 on the corresponding ratchet. The action of the spring 26a, 26b on the corresponding ratchet, and, in particular, on the inclined surface 35 thereof, produces two simultaneous actions: i.e., on the one hand, the pivoting stress directed outward in the teeth-engagement position, and, on the other, the support and contact maintenance of the cylindrical surface 30 of the ratchet against the corresponding support surface 300 of the gauge rod. To this end, the spring 26a, 26b incorporates a central wound portion 261 held in place by a position-retention pin 36 and extended on one side by a support piece 262 and, on the other, by an actuating piece 263 ending in folded support end 260 designed to cooperate with the inclined surface 35 of the ratchet. This inclined surface is produced on the bottom of a central slot 250, whose lateral walls 250a, 250b allow lateral position-retention of the spring by cooperating with the folded end 260 thereof. Furthermore, the stresses generated on the ratchet by the teeth are absorbed by the support of the cylindrical support surface of the ratchet 30 on the corresponding support surface 300 of the pin. It should be added that the stresses generated on the rod 33a, 33b are absorbed, on the one hand, by the embedded attachments of the ends 330, 331 and, on the other, by the support of the central portion 332 thereof on the corresponding surface 333 of the cylindrical aluminum wall 8. This surface 333 has a shape complementing the supported rod surface. Thus, the surface retransmitting the thrust of the ratchet 25 by means of the rod 33 to the tubular extension 7 of the hub body 3 may easily be sized in length and diameter, so that the contact pressure between this rod 33 and the extension 7 thereof can be withstood by the material used to make the latter, which is, in the embodiment shown, aluminum. The length L1 of the support of the gauge rod 33 on the surface 333 of the support piece 7 is greater than the width L2 of the support of the ratchet 25 on the aforementioned rod, so that the stresses on the material used to produce this support piece 7 can be better distributed and that the pressures generated thereon are less than those of the support of the ratchet on the rod.

Figure 4:
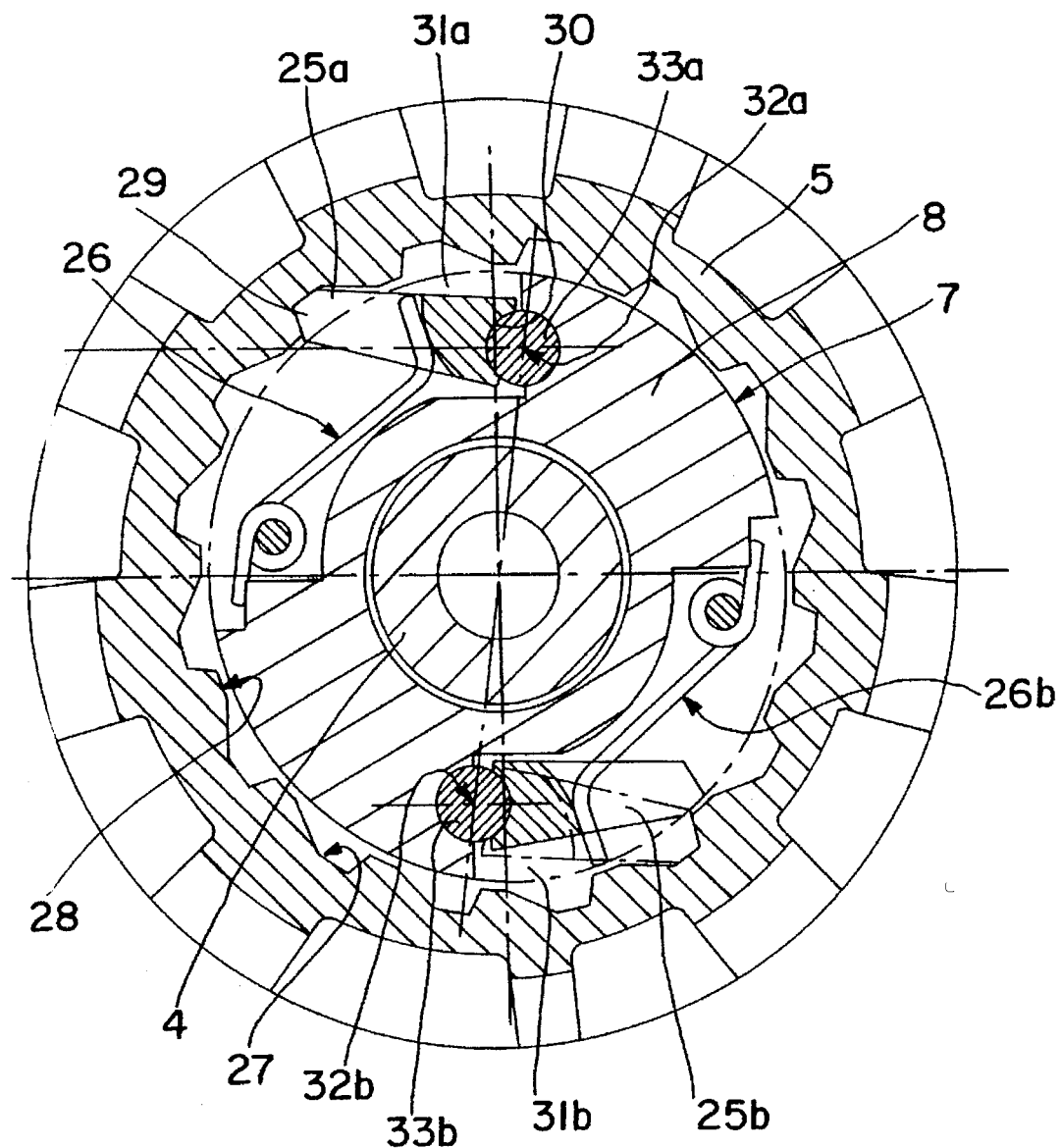
FIG. 4 is a transverse cross-section along line IV—IV in FIG. 3.
Figure 5:
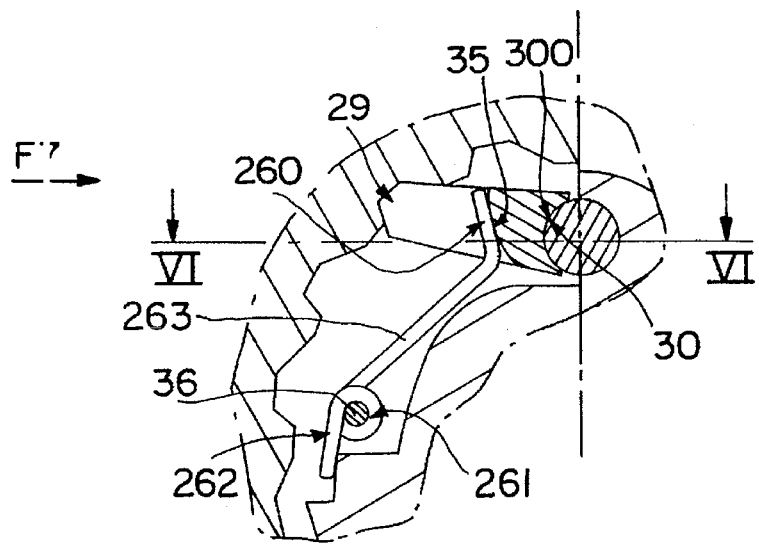
FIG. 5 is a partial detail view of FIG. 4.
Figure 6:
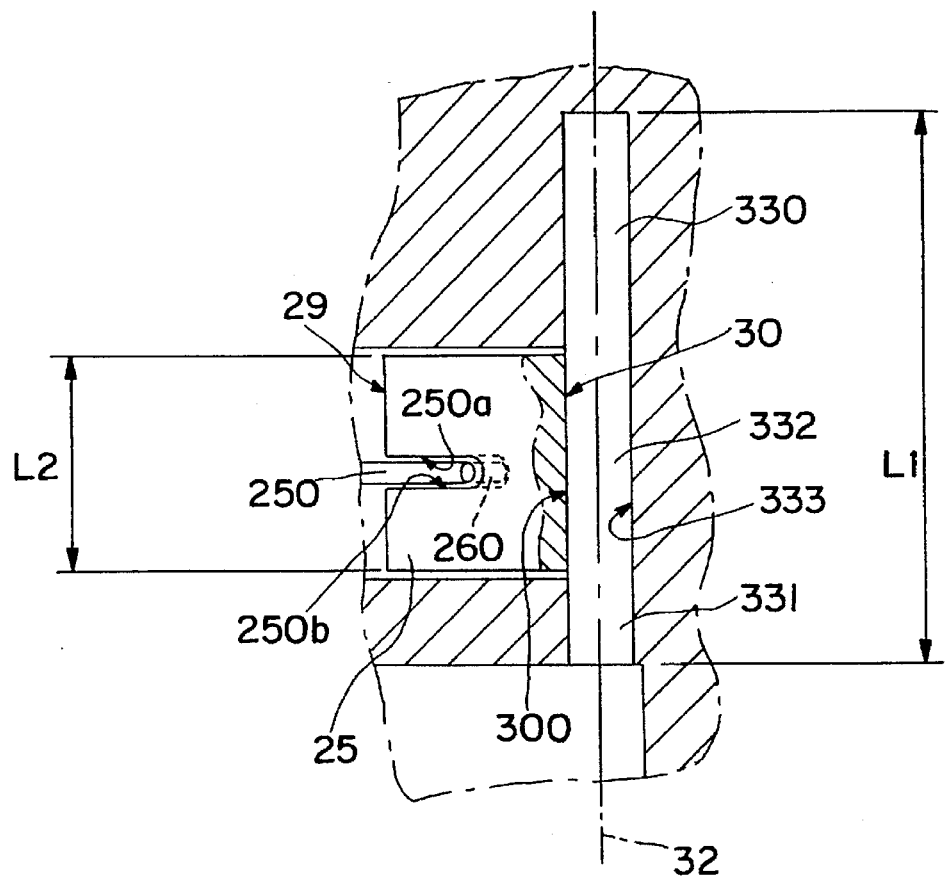
FIG. 6 is a partial cross-section along line VI—VI in FIG. 5.
Figure 7:
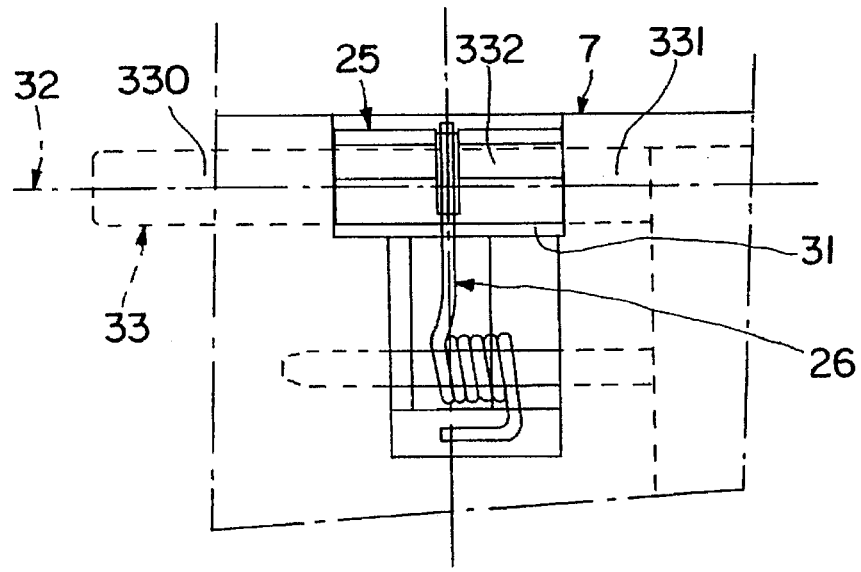
FIG. 7 is a partial lateral view in the direction of arrow F7 in FIG. 5, the free wheel body having been removed.
Figure 8:
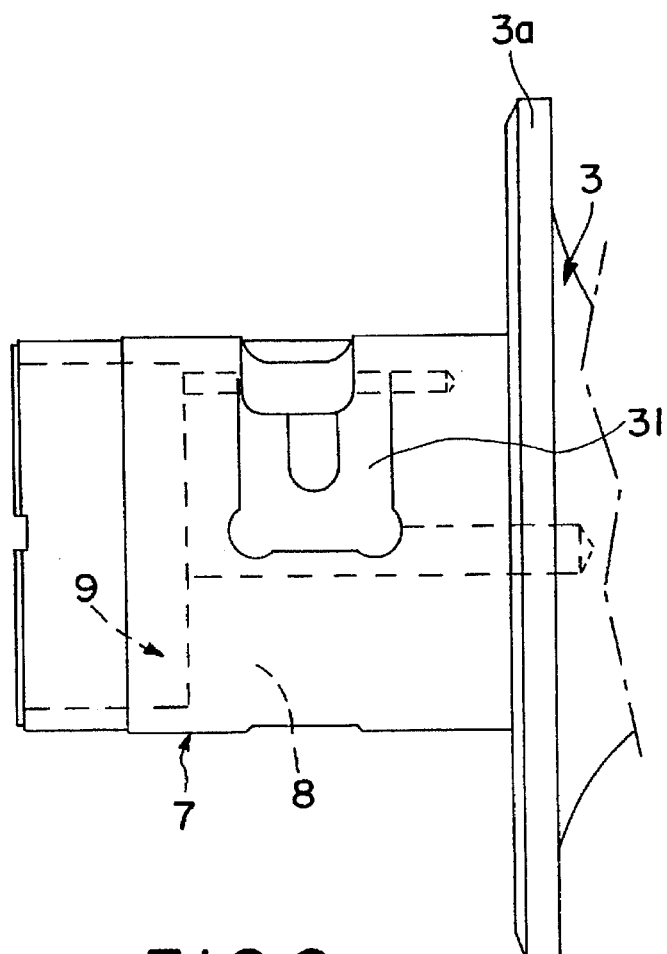
FIG. 8 is an external view of the end of the hub body designed to house the free wheel body, the ratchets not being illustrated.

According to the embodiment described and illustrated by way of example, the free wheel comprises two diametrically-opposite ratchets, but this configuration could be different while remaining within the scope of the invention. It should also be noted that the ratchets can be arranged so as to be engaged together in the teeth of the free wheel body, or to be offset in time, as shown in FIG. 4.

In the embodiment illustrated, the support piece 7 is an extension of the hub body, which is produced as a single part; however, this piece and the ratchet-support piece 7 could also be separate parts fastened to the hub body 3.

The support piece 7 carrying the ratchets according to the invention is made of a material whose mechanical properties and/or density are much inferior to the mechanical properties and/or density of the material used in the free wheel body 5 carrying the gears. When it forms the extension of the hub body 3, the support piece 7 is obviously made of the same material. Accordingly, because the hub body 3 is made of aluminum, the extension thereof 7 is also made of aluminum. However, the hub body 3 and the extension thereof 7 could be made of a plastic material, such as a thermoplastic polyamide filled with carbon fibers. When the support piece 7 carrying the ratchets 25 is independent of the hub body 3, this support piece may thus be made of a material identical to or different from the material in the hub body. However, if it is different, this material retains equivalent mechanical properties and/or density, at least within the same ranges of values, and, in any event, it retains values considerably inferior to those of the free wheel body. Thus, the support piece may be made of aluminum or a plastic material, as mentioned previously. In short, whether the support piece 7 forms a single piece with the hub body 3 or is an independent component, it is made of a material whose rupture strength may be between 700 and 200 megapascals, while the free wheel body 7 and the ratchets 25 are made of a material whose rupture strength may be between 1,000 and 2,000 megapascals. It should be added that the gauge rod 33 is made of a material having properties similar to those of the ratchet, and this material may thus be a steel, as mentioned in the description, or another strong material such as titanium, a beryllium/bronze alloy, or a ceramic.

The properties of the material from which the support piece 7 is made are more similar to the properties of the material used to produce the hub body 3 than to those from which the free wheel body is made.

What is claimed is:

1. A free wheel hub for cycles, comprising (a) a hollow shaft;

(b) a cylindrical hub body mounted for free rotation about said hollow shaft, said hub body having two ends each comprising a housing for at least one ball bearing means held in place on said hollow shaft, one end of said hub body having a tubular extension with a cylindrical wall;

(c) a free wheel body mounted for rotation on said tubular extension of said hub body and being configured to receive staged gears on its outer periphery, and having a series of teeth on its inner periphery;

(d) at least one unidirectional connection ratchet moveable between said hub body and said free wheel body, said at least one ratchet having a meshing end operatively engaging in one of said teeth, and a pivoting end;

(e) said cylindrical wall of said tubular extension of said hub body comprising a housing for each said at least one ratchet, said housing having a width corresponding to a width of said at least one ratchet;

(f) resilient means mounted between said tubular extension and said at least one ratchet for moving said meshing end of said at least one ratchet into engagement with one of said teeth of said free wheel body;

(g) said tubular extension comprising, for each said housing, a cylindrical orifice with an axis parallel to an axis of said hub body, said orifice debouching at an end of said tubular extension and passing through a base of said housing, a cylindrical rod shorter than said ratchet being located in said orifice and having two end portions and a central portion located in a said housing, said end portions being engaged in a wall of said tubular extension on each housing side, and said pivoting end being formed by a cylindrical surface complementary to a surface of said central portion of said cylindrical rod and abutting on said central portion.

2. The free wheel hub according to claim 1, wherein said tubular extension is made of aluminum alloy.

3. The free wheel hub according to claim 2, wherein said tubular extension forms a monobloc assembly with said free wheel body.

4. The free wheel hub according to claim 1, wherein said rod is made of steel.

5. The free wheel hub according to claim 1, wherein said at least one ratchet is made of steel.

6. The free wheel hub according to claim 1, wherein said tubular extension is made of aluminum alloy and said at least one ratchet is made of steel.

7. The free wheel hub according to claim 1, wherein said at least one ratchet has a central slot terminating at said meshing end, and said resilient means is a torsion spring with an actuating end which engages in said slot and in contact with a bottom of said slot in a direction which keeps said at least one ratchet in abutment with said central portion of said slot.

8. The free wheel hub according to claim 7, wherein said bottom of said slot forms an inclined surface with which said actuating end of said torsion spring is in contact so as to move said at least one ratchet into engagement with one of said teeth, and to support said pivoting end of said at least one ratchet in contact with a surface corresponding to said at least one ratchet.

9. The free wheel hub according to claim 7, wherein said torsion spring comprises a central wound portion traversed by a maintenance axis.

10. The free wheel hub according to claim 1, wherein said pivoting end of said at least one ratchet is a cylindrical surface portion having a same diameter as said rod.

11. The free wheel hub according to claim 1, comprising two ratchets located in offset positions relative to said teeth on the internal periphery of said free wheel body.

12. A cycle wheel comprising a free wheel hub according to claim 1.

* * * * *

UNITED STATES PATENT AND TRADEMARK OFFICE
CERTIFICATE OF CORRECTION

PATENT NO. :  5,632,364
DATED      :  May 27, 1997
INVENTOR(S):  Mercat

It is certified that error appears in the above-identified patent and that said Letters Patent is hereby corrected as shown below:

```
Column 6,
      line 13, change "shorter" to --longer--.
```

Signed and Sealed this

Fifteenth Day of June, 1999

Attest:

Q. TODD DICKINSON

*Attesting Officer*   *Acting Commissioner of Patents and Trademarks*